US011358186B2

(12) United States Patent
Busch et al.

(10) Patent No.: US 11,358,186 B2
(45) Date of Patent: Jun. 14, 2022

(54) CONNECTOR HEAD AND VALVE BLOCK

(71) Applicant: GEA Aseptomag AG, Kirchberg (CH)

(72) Inventors: Heiko Busch, Flensburg (DE); Reimar Gutte, Burgwedel (DE); Thomas Christian Hagnauer, Thun (CH); Urs Langenegger, Worb (CH)

(73) Assignee: GEA Aseptomag AG

(*) Notice: Subject to any disclaimer, the term of this patent is extended or adjusted under 35 U.S.C. 154(b) by 75 days.

(21) Appl. No.: 16/621,349

(22) PCT Filed: Jun. 6, 2018

(86) PCT No.: PCT/EP2018/064848
§ 371 (c)(1),
(2) Date: Dec. 11, 2019

(87) PCT Pub. No.: WO2018/234036
PCT Pub. Date: Dec. 27, 2018

(65) Prior Publication Data
US 2020/0115211 A1  Apr. 16, 2020

(30) Foreign Application Priority Data
Jun. 23, 2017  (CH) ..................... 00831/17

(51) Int. Cl.
*B08B 9/093* (2006.01)
*B67C 3/34* (2006.01)
(Continued)

(52) U.S. Cl.
CPC ............... *B08B 9/093* (2013.01); *B67C 3/34* (2013.01); *B67D 1/0834* (2013.01); *B67D 1/0887* (2013.01); *F16K 27/07* (2013.01)

(58) Field of Classification Search
CPC ............. B67D 1/0834; F16K 11/10–24; B08B 9/093–0936; B08B 3/02; B08B 3/024; B08B 3/028
See application file for complete search history.

(56) References Cited

U.S. PATENT DOCUMENTS

| | | | | |
|---|---|---|---|---|
| 456,546 A | * | 7/1891 | Blankerts | ................ F16K 11/22 137/883 |
| 3,121,536 A | * | 2/1964 | McKibben | ............ B08B 9/0936 239/246 |

(Continued)

FOREIGN PATENT DOCUMENTS

| | | |
|---|---|---|
| CH | 706952 | 3/2014 |
| DE | 2751733 | 5/1979 |

(Continued)

OTHER PUBLICATIONS

Examination Report dated Oct. 15, 2020, 4 pages issued in connection with corresponding European Patent Application No. 18729420.

(Continued)

*Primary Examiner* — Andrew D Stclair
(74) *Attorney, Agent, or Firm* — Merek, Blackmon & Voorhees, LLC

(57) ABSTRACT

The invention relates to a connector head (12) comprising an interior space (40), a tank connector (13) which is in fluid communication with the interior space (40) and which can be fluidly connected to a valve apparatus (10) mounted on the tank (9) for filling or emptying the tank (9), a product port (14) in fluid communication with the interior space (40) and a discharge port (33) in fluid communication with the interior space (40). To allow a tank to be filled and emptied under improved hygienic conditions, it is proposed that the connector head (12) comprises a first valve (29), with which first valve (29) the product port (14) can be shut off from the interior space (40), a second valve (34), with which second (Continued)

Figure 1:
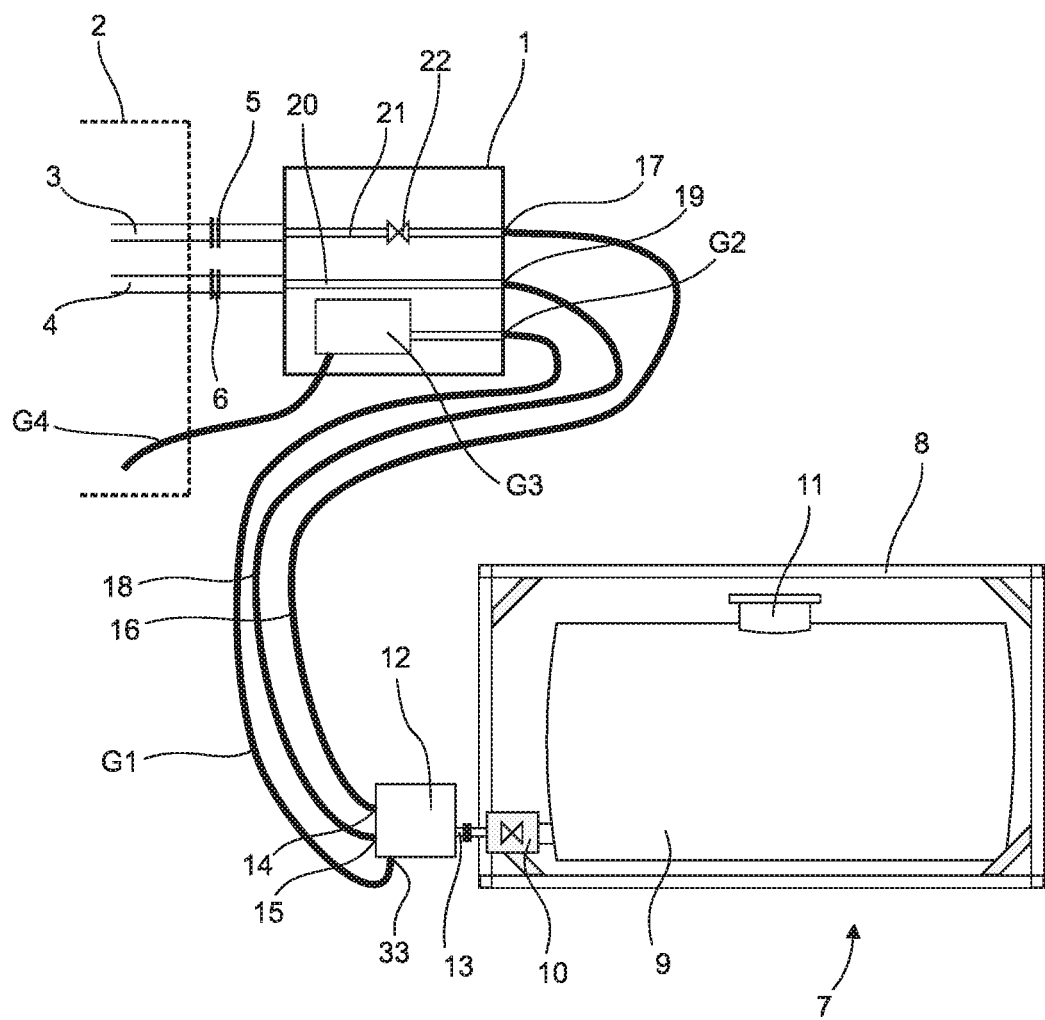

valve (34) the discharge port (33) can be shut off from the interior space (40), and a cleaning device (38) adapted and arranged to clean the interior space (40) and the tank connector (13). The invention also relates to a valve block.

18 Claims, 4 Drawing Sheets

(51) Int. Cl.
    *B67D 1/08*    (2006.01)
    *F16K 27/07*    (2006.01)

(56) References Cited

U.S. PATENT DOCUMENTS

| | | | | |
|---|---|---|---|---|
| 3,444,869 | A | * | 5/1969 | Guignon, Jr. ......... B08B 9/0936 134/167 R |
| 3,633,869 | A | * | 1/1972 | Lehmann ............ F16K 31/0689 251/129.18 |
| 3,856,570 | A | * | 12/1974 | McDermott ............ B08B 9/093 134/36 |
| 4,030,513 | A | * | 6/1977 | McKenzie ................ B05B 3/06 134/179 |
| 4,208,219 | A | * | 6/1980 | Etscheid ................ B08B 9/093 134/169 R |
| 4,241,761 | A | * | 12/1980 | Miller ................... F16K 11/022 137/883 |
| 4,913,185 | A | | 4/1990 | Mattei |
| 5,967,188 | A | * | 10/1999 | Chien-Chuan ........ F16K 27/003 137/861 |
| 8,667,989 | B1 | * | 3/2014 | Feldmeier ............... F16K 11/20 137/885 |
| 2007/0137707 | A1 | * | 6/2007 | Matsuzawa ........... F16K 37/005 137/240 |
| 2010/0072411 | A1 | * | 3/2010 | Norton .................... F16K 1/446 251/333 |

FOREIGN PATENT DOCUMENTS

| | | |
|---|---|---|
| DE | 202005004711 | 6/2005 |
| DE | 202006004174 | 7/2007 |
| DE | 202011102059 | 11/2011 |
| EP | 0332806 | 9/1989 |
| WO | WO 01/71228 | 9/2001 |

OTHER PUBLICATIONS

International Search Report dated Sep. 10, 2018 issued in connection with International Application No. PCT/EP2018/064848, 2 pages.
International Preliminary Report on Patentability issued in connection with International Application No. PCT/EP2018/064848, 6 pages.

* cited by examiner

CONNECTOR HEAD AND VALVE BLOCK

The invention relates to a connector head according to the preamble of claim 1 and to a valve block according to the preamble of claim 10.

International goods flows are more important than ever before, also for sensitive goods such as those in the food sector. Flows of goods over long distances, often from one continent to another, are of particular interest in that regard.

It is commercially interesting in the food sector, for example, to process fruit harvested in South America into a liquid basic foodstuff or food product. After it has been produced, this basic foodstuff or food product is transported by sea to Europe, where it is processed into the final food product. Other intercontinental transport routes are also being developed, for example between Asia and Europe and between South America and Asia.

However, this is only possible if hygienic, preferably aseptic, conditions prevail throughout the entire transport route. Providing such conditions is a major technical challenge.

Fluid precursor products are transported in a tank container, so called. The latter is a standardised frame construction containing a tank or vessel. The tank is fitted with a valve apparatus for filling and emptying.

A very advantageous tank container valve apparatus is proposed in CH 706952 A2. Said valve apparatus comprises means with which a germ barrier can be formed inside the valve apparatus. The germ barrier is formed, for example, when filling in South America is completed, and is not removed until the tank is emptied in Europe. Thanks to the germ barrier, the entire transportation process, including shipment, is carried out under aseptic conditions.

What is now important is to prevent any entry of germs into the product when connecting the valve apparatus of the tank container to its counterpart in the filling or emptying station.

One solution on a smaller scale is known from beer kegs, for example, to which a treatment head is attached in order to fill or empty the keg. DE 10 2014 106 203 A1 shows an example of such a treatment head.

The object of the invention is therefore to provide a connector head and a valve block with which a tank can be filled or emptied under improved hygienic conditions.

This object is achieved by a connector head having the features of claim 1 and by a valve block having the features of claim 10. The dependent claims specify advantageous developments of the invention.

The connector head has a first valve for shutting off a product port from an interior space inside the connector head. A second valve on the connector head allows any discharge from the interior space to be shut off. A cleaning device is provided which is adapted and arranged to clean the interior space and a tank connector. Cleaning may advantageously include sterilisation of the interior space of the connector head, for example by selecting an appropriate fluid which is introduced with the aid of the cleaning device. Such a fluid can be hot water steam, for example. In combination with a cleaning device, being able to shut off the product port and the discharge outlet results in very hygienic to aseptic conditions in the interior space and at the tank connector of the connector head. It is possible in this way to reduce substantially the entry of germs when filling or emptying a tank.

In a first development of the invention, the cleaning device comprises a jet cleaner. A cleaning agent that hits a surface in a jet has an additional mechanical component that intensifies the cleaning effect. This allows faster cleaning times and the use of less aggressive cleaning agents.

By shaping at least one jet outlet of the jet cleaner in such a way that a jet of the cleaning agent leaves the connector head through the tank connector, the valve apparatus connected to the connector head during cleaning is included in the advantageous jet cleaning process, thus intensifying the cleaning effect.

In another development of the invention, the jet cleaner has a spray ball which further improves the cleaning effect due to its symmetry.

The hygienic conditions in the connector head are further improved by designing the cleaning device so that it can be shut off from the interior space. This significantly reduces contamination.

Very good cleaning effects are achieved, in addition, if the cleaning device can be moved to a cleaning position inside the interior space and to a neutral position in which it is separated from the interior space. By this means, it is deep inside the interior space during cleaning, with the result that the latter is well cleaned, and does not obstruct the flow of product during filling and emptying.

Arranging the cleaning device on one side of the interior space that is opposite a discharge outlet leading out of the interior space allows the connector head to be aligned with the force of gravity in such a way that cleaning is improved by assured discharge of the cleaning agent from the interior space and the connector head.

According to another development of the invention, those parts of the first valve facing towards the interior space are cleaned by a cleaning device which is suitably adapted and arranged. This intensifies cleaning, in that the first valve in the product pathway is also cleaned thoroughly.

According to yet another development of the invention, a first valve is proposed which is easy to clean as a consequence of its design, and which thus forms a hygienic shut-off means.

A valve block comprising a connector head as described in the foregoing forms a flexible means of producing a connection between a tank container and a processing plant under very hygienic and aseptic conditions.

The invention shall now be described in further detail with reference to an embodiment and developments of the invention, and the effects and advantages shall be described in greater depth.

Figure 2:
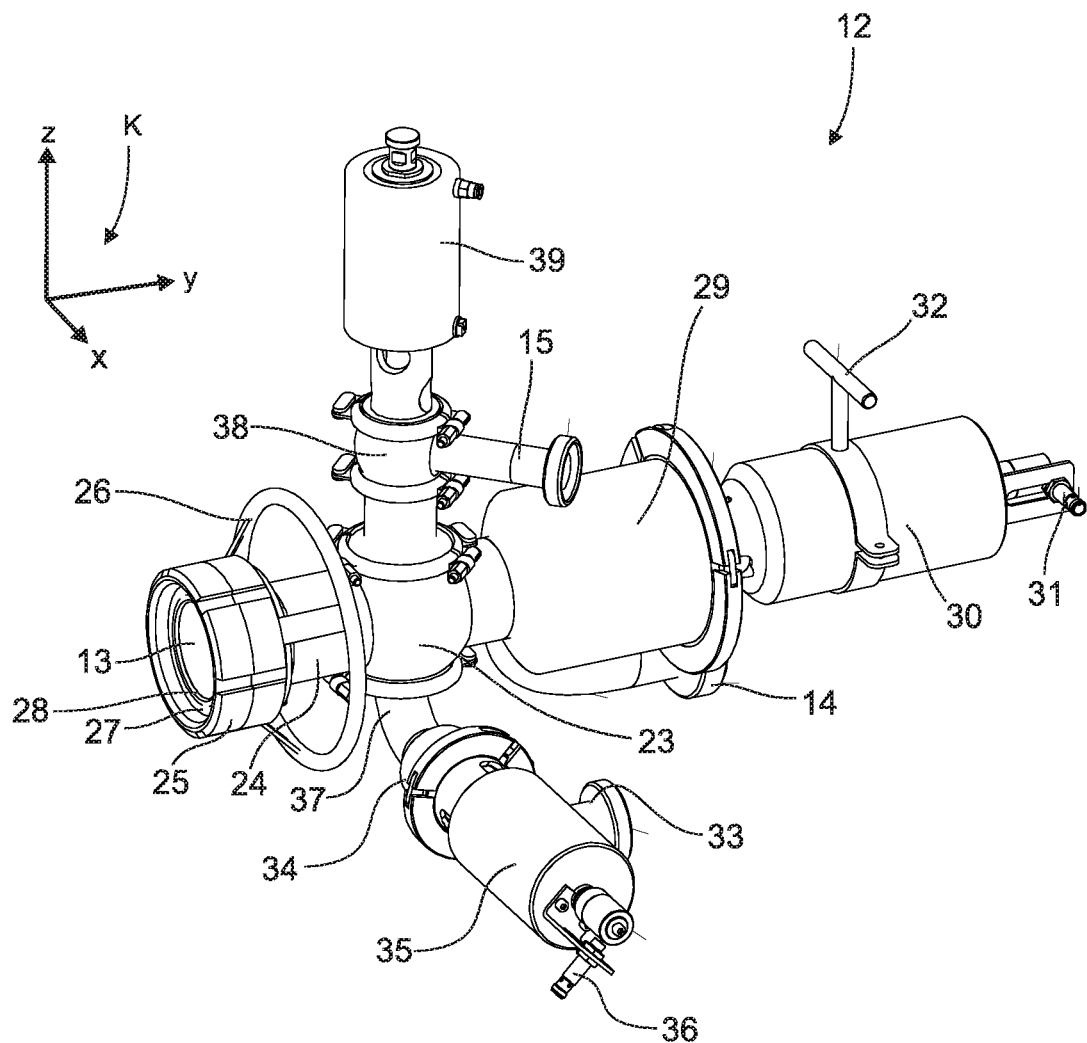
Figure 3:
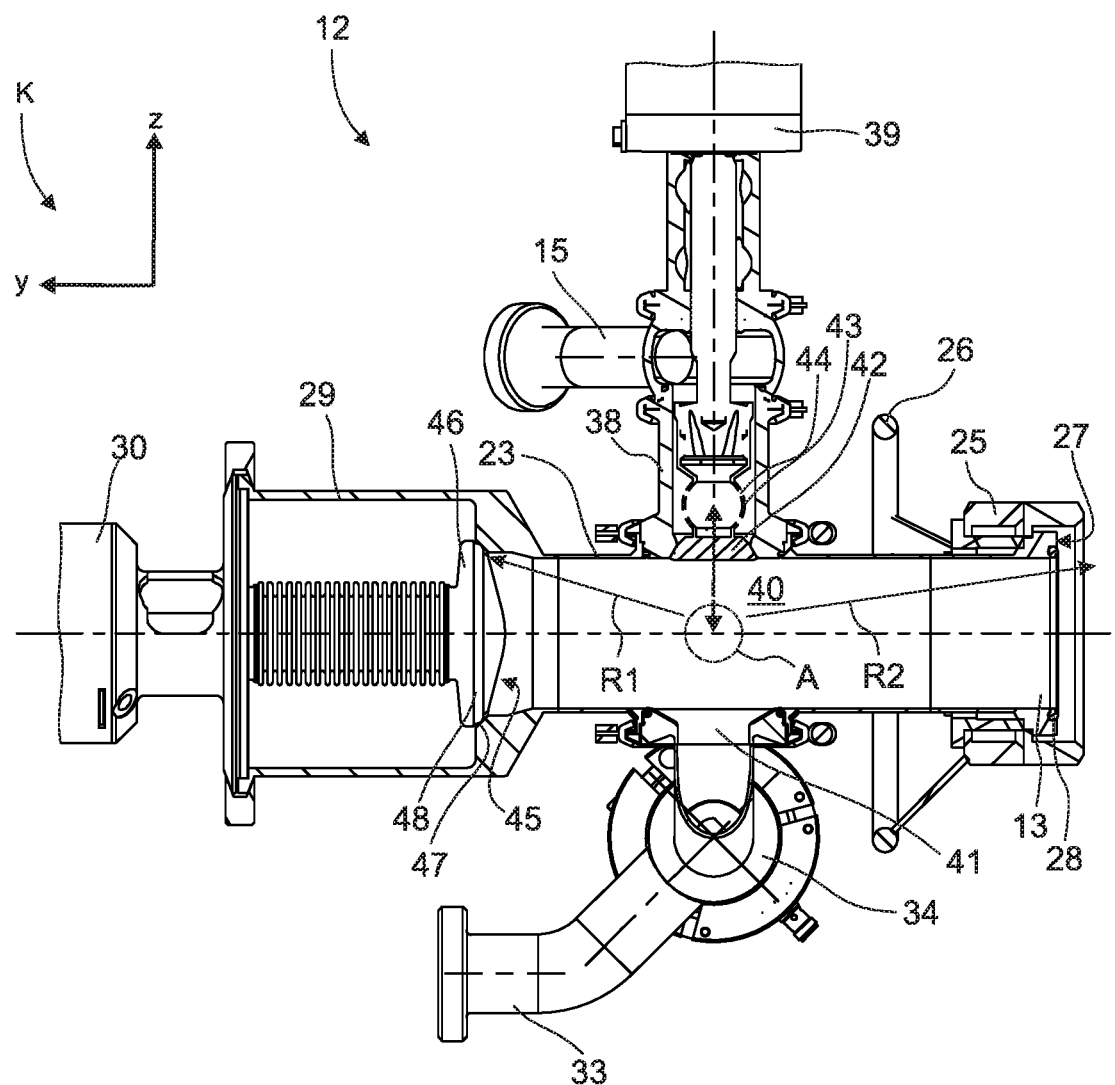
Figure 4:
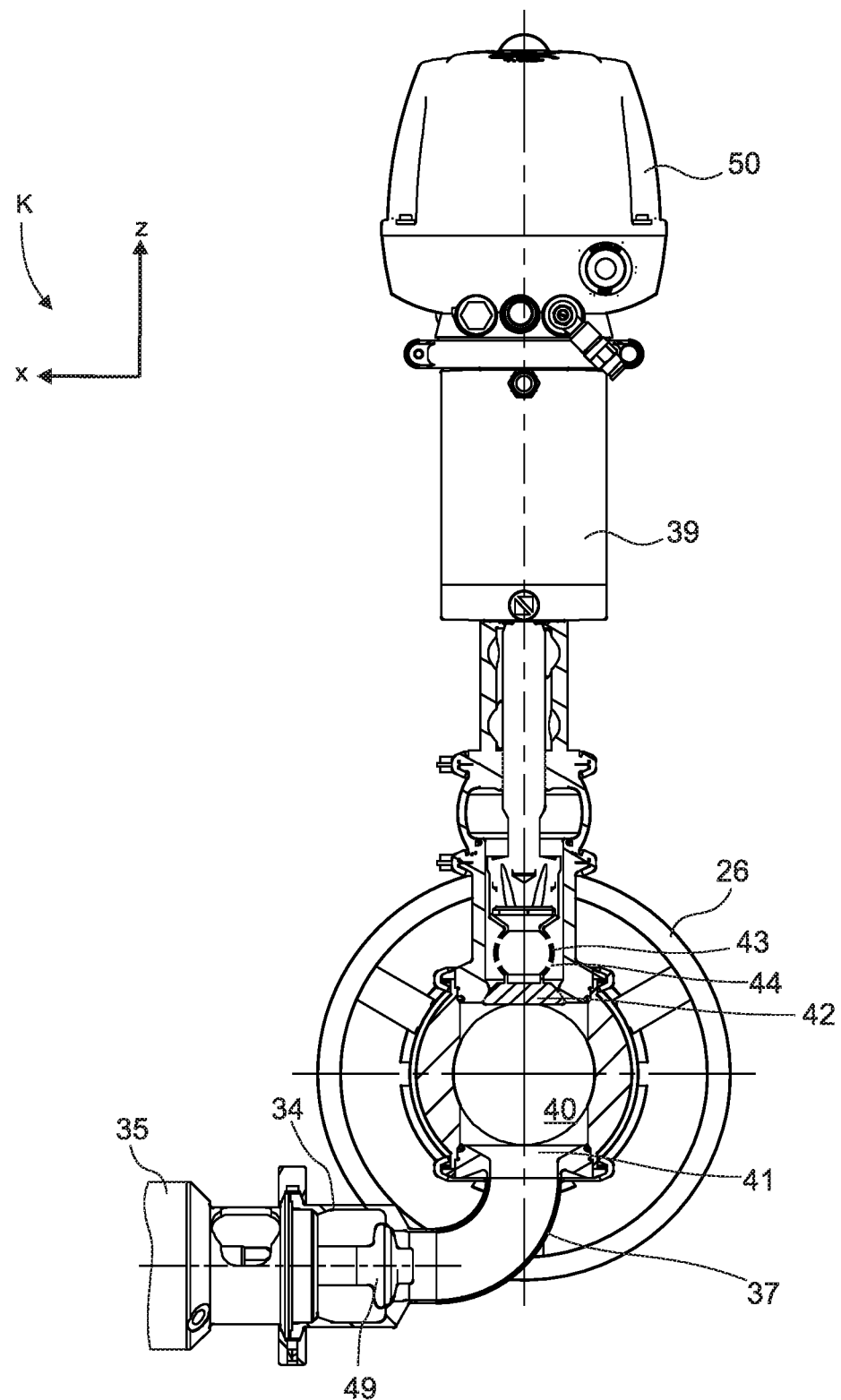

FIG. 1: shows a schematic view of a valve block comprising a connector head and a tank container connected thereto;

FIG. 2: shows a perspective view of the connector head;

FIG. 3: shows a cross-section through the connector head in a plane with a cleaning device, a tank connector and a first valve;

FIG. 4: shows a cross-section through the connector head in a plane with the cleaning device and a second valve.

FIG. 1 shows, in a schematic view, an arrangement comprising a valve block 1. Valve block 1 is connected to a processing plant 2. Processing plant 2 can be a plant for producing a precursor product or a final product. Alternatively, it can be a plant for transferring or for final processing of a precursor product. Processing plant 2 has product piping 3 which is appropriate for the process and which feeds the product to the necessary processing points. Processing plant 2 also has a cleaning system 4 which allows cleaning agents to be provided and distributed within processing plant 2. Valve block 1 is connected to product piping 3 and cleaning system 4, for example with the aid of a releasable product coupling 5 and a releasable cleaning agent coupling 6. Valve block 1 serves as an interface between processing plant 2 and a tank container 7.

Tank container 7 comprises a frame 8 in which a tank 9 is mounted. The frame is standardised, preferably in accordance with standards in the transport business, and thus allows transport by ship, rail and truck in an advantageously simple manner from the technical and economical perspective. A valve apparatus 10 used for filling and emptying is mounted on tank 9. It is advantageously configured for aseptic transport in such a way that a germ barrier is formed in it during transport. An advantageous configuration is the one according to CH 706952 A2. Tank 9 can have a so-called manhole 11 that can be used for inspection, maintenance and cleaning work. In such cases also, it is necessary to prevent germs from entering. To that end, manhole 11 may include a germ barrier, for example one designed in accordance with DE 10 2011 054 137 A1.

Valve block 1 comprises a connector head 12 so that a connection for filling or emptying, or both, can be established between valve block 1 and valve apparatus 10 of tank 9.

Connector head 12 has a tank connector 13 which which it can be releasably connected to valve apparatus 10. A product port 14 and a cleaning agent port 15 are provided on connector head 12 and provide connectability to valve block 1.

A product line 16 which provides fluid communication to a product outlet 17 provided at valve block 1 is connected to product port 14. The connections between product line 16 and product port 14, and between product line 16 and product outlet 17, can be so designed that they are releasable.

A cleaning line 18 providing a fluid connection to a cleaning agent outlet 19 provided at valve block 1 is connected to cleaning agent port 15. The connections between cleaning line 18 and cleaning agent port 15, and between cleaning line 18 and cleaning agent outlet 19, can be so designed that they are releasable.

For some sizes of tank container 7, it is advantageous if product line 16 and cleaning line 18 are designed to be mechanically flexible, with the result that connector head 12 is movable relative to valve block 1. In large filling plants, it can be advantageous for fast filling processes to provide a plurality of connector heads 12 for coupling a plurality of tank containers 7 simultaneously. Connector heads 12 are connected advantageously by fixed piping to valve block 1.

Valve block 1 is fitted with the means necessary for it to function as an interface between processing plant 2 and tank container 7. These means comprise an internal cleaning line 20 for conducting the cleaning agent, which travels via cleaning coupling 6 from processing plant 2 to valve block 1, to cleaning agent outlet 19. The product, which enters valve block 1 via product coupling 5, is fed by means of an inner product line to product outlet 17. A product valve 22 may be provided and allows the flow of fluid to be interrupted, for example for maintenance work on one of the components.

Connector head 12 is shown in a perspective view in FIG. 2. By way of illustration, a 3D coordinate plane K is shown in which the z-axis defines a direction of gravity which is perpendicular to a horizontal plane formed by the x-axis and y-axis.

The core of the connector head 12 shown here by way of example is a central casing 23, on which the other parts of connector head 12 are mounted.

A first part is tank connector 13. The latter comprises a pipe section 24 on which a closure sleeve 25 is rotatably arranged. Rotation can be carried out by means of a hand wheel 26. Closure sleeve 25 can have an inner bayonet or thread by means of which a releasable connection to a matching counterpart on valve apparatus 10 can be produced. A seal 28 for sealing the connection between tank connector 13 and valve apparatus 10 is arranged on, or at least partially recessed into, an end face 27 surrounded by closure sleeve 25.

A next part of connector head 12 is a first valve 29. The first valve 29 is advantageously arranged on the side of central casing 23 opposite tank connector 13. This first valve 29 is arranged in fluid communication between central casing 23 and product port 14. A first drive means 30 is provided, with which a switching state of the first valve 29 can be changed. A first sensor 31 is mounted on the first drive means 30 and is used to monitor the functioning of first drive means 30. The signal from the first sensor 31 allows the switching state of the first valve 29 to be deduced.

A handle 32 is provided on the first drive means 30. Hand wheel 26 and handle 32 allow the connector head to be aligned, for example during transport from a storage location near valve block 1, with tank container 7. Hand wheel 26 and handle 32 also allow connector head 12 to be aligned when fitting connector head 12 to the valve apparatus 10 of tank container 7.

Another part of connector head 12 is discharge port 33. A second valve 34 is arranged in the fluid connection between discharge port 33 and central casing 23. With the aid of this second valve 34, the fluid connection between discharge port 33 and the central casing can be established and disconnected. Switching the second valve 34 between these two switching states can be done with the aid of a second drive means 35. A second sensor 36 is mounted on drive means 35 and transmits its switching state as a sensor signal. This allows the switching state of the second valve 34 to be deduced. In order to reduce the dimensions of connector head 12 in the z-axis and to minimise the amount of space required by central casing 23, on which discharge port 33 is arranged, a discharge pipe elbow 37 can be installed between central casing 23 and the second valve 34.

Discharge port 33 is in fluid communication with a discharge line G1, see FIG. 1, which can be flexible in design and which is connected to inlet G2 of valve block 1. A collecting tank G3, in which fluid discharged from connector head 12 via discharge line G1 is collected, can be advantageously provided inside valve block 1. This fluid can be used cleaning fluid, for example. The fluid collected in collecting tank G3 is transferred via a disposal line G4 to a disposal unit of processing plant 2.

A cleaning device 38 is arranged on the side of central casing 23 opposite discharge port 33. In this example, the cleaning device is advantageously fitted with a third drive means 39. The cleaning agent port 15 of connector head 12 is arranged on cleaning device 38.

FIG. 3 shows a cross-section through connector head 12 in the z-y plane.

Central casing 23 has an interior space 40 at which the first valve valve 29 and tank connector 13 are arranged. Interior space 40 provides fluid communication between those components. A discharge outlet 41 leads out of interior space 40 into discharge pipe elbow 37, to which the second valve 34 is connected.

In order to fill tank container 7, the first valve 29 is opened and the second valve 34 is closed, thus providing a fluid connection between product port 14 and tank connector 13, via which the product can flow out of processing plant 2 into the tank 9 of tank container 7. Valves 29 and 34 are in the same switching position when emptying container 9.

It is advantageous, for the flow of product and its influence on the product itself, as well as the formation of residues in interior space 40, to arrange the first valve 29 and tank connector 13 opposite each other at interior space 40.

In order to prevent the entry of germs while filling or emptying tank 9, it is advantageous if interior space 40 can be cleaned after establishing the mechanical and sealed connection between tank connector 13 and valve apparatus 10. For that purpose, connector head 12 includes cleaning device 38.

Cleaning device 38 has an adjustable cleaner trap 42, by means of which cleaning device 38 can be shut off from interior space 40.

Cleaning device 38 is designed as an adjustable jet cleaner. Examples of such adjustable jet cleaners are specified by utility models DE 20 2004 012 949 U1 and DE 20 2005 004 711 U1.

One part of cleaning device 38 is a spray ball 43 which has at least one jet outlet 44, preferably a plurality of such jet outlets 44.

In FIG. 3, cleaning device 38 is shown in a neutral position in which it is separated from interior space 40. In this neutral position, spray ball 43 is sealingly separated from interior space 40 by cleaner trap 42. With the aid of the third drive means 39, spray ball 43 and hence cleaning device 38 can be moved from the neutral position to a cleaning position A. In the cleaning position, spray ball 43 is located in the interior space 40 of the central casing. In the cleaning position, jet outlet 44 or jet outlets 44 are arranged in such a way that cleaning agent flowing through cleaning agent port 15 flows in the form of a jet into interior space 40.

A cleaning jet R1 is preferably directed onto an end face 45 of a valve plate 46 of the first valve 29, so that the parts of the first valve 29 facing towards interior space 40 are cleaned by cleaning device 38. By lifting valve plate 46, it is possible to clean valve seat 47 and valve seal 48 thoroughly.

Tank connector 13 is likewise hit by a cleaning jet or plurality of cleaning jets and is thus cleaned.

In addition, cleaning jet R2 passes through tank connector 13 and reaches the valve apparatus 10 of tank container 7. Due to the mechanical action of the pressurised cleaning fluid, the jet thoroughly cleans said valve apparatus 10.

The number and shape of jet outlets 44 are selected with the aim of reliably cleaning the surfaces of interior space 40, tank connector 13 and valve apparatus 10.

Cleaning device 38 is arranged on the side of interior space 40 opposite discharge outlet 41. In a simple manner, this gives cleaning device 38 a space-saving structure in which discharge outlet 41 is arranged at the position within interior space 40 which is lowest in relation to the direction of gravity. The fluids resulting from the cleaning operation are thus removed thoroughly from the interior space via discharge port 33.

FIG. 4 shows a cross-section through connector head 12 in the z-x plane.

This cross-section clearly shows how connector head 12 is designed for residue-free discharge of fluids during the cleaning operation. When connector head 12 is oriented in the intended manner, discharge outlet 41 is located at the lowest point of interior space 40. Fluid passes through discharge outlet 41 and into discharge pipe elbow 37, which opens into the second valve 34. This opening can be tightly closed by the closure member 49 of the second valve 34.

Closure member 49 can be moved by the second drive means 35 in a stroke movement and to a position in which a fluid connection exists between the interior of discharge pipe elbow 37 and discharge port 33. Due to this arrangement and design, the entire fluid flows out of interior space 40 before the second valve 34 is closed.

FIG. 4 shows a control head 50 arranged on the third drive means 39. This control head is designed to control the third drive means 39 and thus to move the spray ball 43 between the neutral position and cleaning position A. Control head 50 can be configured to perform other control functions, for example to control the first and second drive means 30 and 35.

The first, second and third drive means 30, 35 and 39 can be designed to be driven by a pressurising medium, for example pneumatically. The pressurising medium can be supplied via a set of lines in which product line 16 and cleaning line 18 are also grouped. A line for discharge port 33 can likewise be included. These and other connections and lines can be routed through valve block 1. The control unit of valve block 1 can also assume control of connector head 12, for which purpose electrical terminals for control head 50 can be provided.

LIST OF REFERENCE SIGNS

1 Valve block
2 Processing plant
3 Product pipeline
4 Cleaning system
5 Product coupling
6 Cleaning agent coupling
7 Tank container
8 Frame
9 Tank
10 Valve apparatus
11 Manhole
12 Connector head
13 Tank connector
14 Product port
15 Cleaning agent port
16 Product line
17 Product outlet
18 Cleaning agent line
19 Cleaning agent outlet
20 Inner cleaning line
21 Inner product line
22 Product valve
23 Central casing
24 Pipe section
25 Closure sleeve
26 Hand wheel
27 End face
28 Seal
29 First valve
30 First drive means
31 First sensor
32 Handle
33 Discharge port
34 Second valve
35 Second drive means
36 Second sensor
37 Discharge pipe elbow
38 Cleaning device
39 Third drive means
40 Interior space
41 Discharge outlet 42 Cleaner trap
43 Spray ball
44 Jet outlet
45 End face
46 Valve plate
47 Valve seat
48 Valve seal
49 Closure member
50 Control head
G1 Discharge line
G2 Inlet
G3 Collecting tank
G4 Disposal pipeline
A Cleaning position
K 3D coordinate plane
R1 First cleaning jet
R2 Second cleaning jet

The invention claimed is:

1. A connector head, comprising:
an interior space,
a tank connector which is in fluid communication with the interior space and which can be fluidly connected to a valve apparatus mounted on a tank for filling or emptying the tank,
a product port in fluid communication with the interior space, and
a discharge port in fluid communication with the interior space,
wherein the connector head comprises a first valve, said first valve being configured to shut off the product port from the interior space,
a second valve, said second valve being configured to shut off the discharge port from the interior space, and
a cleaning device adapted and arranged to clean the interior space and the tank connector wherein said cleaning device includes a jet cleaner and the jet cleaner has a jet outlet configured to generate a cleaning jet leaving the connector head through the tank connector, and wherein the cleaning jet is unimpeded from the jet outlet to a point at which the cleaning jet leaves the connector head through the tank connector, and
wherein the cleaning device is so designed that it can be shut off from the interior space.

2. The connector head according to claim 1, wherein the jet cleaner comprises a spray ball.

3. The connector head according to claim 1, wherein the cleaning device is so designed that it can be moved to a cleaning position inside the interior space and to a neutral position in which it is separated from the interior space.

4. The connector head according to claim 1, wherein the cleaning device is arranged on one side of the interior space that is opposite a discharge outlet leading out of the interior space.

5. The connector head according to claim 1, wherein the cleaning device is adapted and arranged to clean the interior space, including those parts of the first valve facing towards the interior space.

6. The connector head according to claim 1, wherein the first valve has a valve seat and a closed valve plate with adjustable stroke action.

7. A valve block for filling or emptying a tank, comprising:
a product outlet and a cleaning agent outlet,
the valve block further comprising a connector head including an interior space, a tank connector which is in fluid communication with the interior space and which can be fluidly connected to a valve apparatus mounted on the tank for filling or emptying the tank, a product port in fluid communication with the interior space, and a discharge port in fluid communication with the interior space,
wherein the connector head further comprises a first valve, said first valve being configured to shut off the product port from the interior space, a second valve, said second valve being configured to shut off the discharge port from the interior space, and
a cleaning device adapted and arranged to clean the interior space and the tank connector and wherein the product outlet is connected by a product line to the product port of the connector head and by a cleaning line to the cleaning device of the connector head; and,
wherein the cleaning device comprises a jet cleaner and the jet cleaner has a jet outlet configured to generate a cleaning jet leaving the connector head through the tank connector, and wherein the cleaning jet is unimpeded from the jet outlet to a point at which the cleaning jet leaves the connector head through the tank connector, and
wherein the cleaning device is so designed that it can be shut off from the interior space.

8. The valve block according to claim 7, wherein the jet cleaner comprises a spray ball.

9. The valve block according to claim 7, wherein the cleaning device is so designed that it can be moved to a cleaning position inside the interior space and to a neutral position in which it is separated from the interior space.

10. The valve block according to claim 7, wherein the cleaning device is arranged on one side of the interior space that is opposite a discharge outlet leading out of the interior space.

11. The valve block according to claim 7, wherein the cleaning device is adapted and arranged to clean the interior space, including those parts of the first valve facing towards the interior space.

12. The valve block according to claim 7, wherein the first valve has a valve seat and a closed valve plate with adjustable stroke action.

13. The connector head according to claim 2, wherein the cleaning device is so designed that it can be moved to a cleaning position inside the interior space and to a neutral position in which it is separated from the interior space.

14. The connector head according to claim 2, wherein the cleaning device is arranged on one side of the interior space that is opposite a discharge outlet leading out of the interior space.

15. The connector head according to claim 1, wherein a longitudinal axis extends through said interior space and a center of said tank connector, said first valve moves parallel to said longitudinal axis between an open position and a closed position.

16. The connector head according to claim 1, wherein a longitudinal axis extends through said interior space and a center of said tank connector, said second valve is disposed relative to said longitudinal axis such that no portion of said longitudinal axis passes through said second valve when the second valve is in a closed position.

17. The connector head according to claim 7, wherein a longitudinal axis extends through said interior space and a center of said tank connector, said first valve moves parallel to said longitudinal axis between an open position and a closed position.

18. The connector head according to claim 7, wherein a longitudinal axis extends through said interior space and a center of said tank connector, said second valve is disposed relative to said longitudinal axis such that no portion of said longitudinal axis passes through said second valve when the second valve is in a closed position.

* * * * *